(12) United States Patent
Murakami (10) Patent No.: US 7,533,807 B2
(45) Date of Patent: May 19, 2009

(54) IDENTIFICATION CARD ISSUING APPARATUS AND IDENTIFICATION CARD ISSUING METHOD

(75) Inventor: Atsushi Murakami, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 625 days.

(21) Appl. No.: 11/132,451

(22) Filed: May 19, 2005

(65) Prior Publication Data

US 2006/0005235 A1 Jan. 5, 2006

(30) Foreign Application Priority Data

May 20, 2004 (JP) ............................... 2004-150633

(51) Int. Cl.
*G06K 5/00* (2006.01)
(52) U.S. Cl. ...................... 235/380; 235/492
(58) Field of Classification Search ................ 235/379, 235/380, 381, 492
See application file for complete search history.

(56) References Cited

U.S. PATENT DOCUMENTS 4,995,081 A 2/1991 Leighton et al.
6,527,173 B1 * 3/2003 Narusawa et al. ........... 235/380
2002/0034305 A1 * 3/2002 Noyama et al. ............. 380/282

FOREIGN PATENT DOCUMENTS

| EP | 1 260 944 A2 | 11/2002 |
| JP | 2002-2154 | 1/2002 |
| WO | WO 01/20564 A1 | 3/2001 |
| WO | WO 03/034334 A1 | 4/2003 |

* cited by examiner

*Primary Examiner*—Kumiko C Koyama
(74) *Attorney, Agent, or Firm*—Pillsbury Winthrop Shaw Pittman, LLP (57) ABSTRACT

Private information, such as a face image, to specify an applicant is input through input terminal devices. An ID number is read from an identification medium, using an IC reader/writers contained in printers. The private information is printed on a printing surface of the identification medium along with the ID number. The printing history at this time is stored in an issuance server in association with the ID number. The identification medium with surface information printed on the printing surface is set in a recording terminal device. The ID number is read from the identification medium, using the IC reader/writer, and the printing history is read form the issuance server, using the ID number as a key. Based on the read-out printing history, the personal information is recorded in an IC chip of the identification medium along with the ID number.

6 Claims, 7 Drawing Sheets

| Recorder section | Item | Content example |
|---|---|---|
| Manufacturer | ID number | AA0100123 |
| Issuer | Name | Ichiro Tokyo |
| | Date of birth | 19651023 |
| | Sex | 1 (male) |
| | Address | 1-1-1, Saiwai-ku, Kawasaki-shi |
| | Receipt No. | 1939208 |
| | Date of issue | 20040301 |
| | Date of expiry | 20090228 |
| | Face image | (Omitted) |
| | Applicant signature image | (Omitted) |
| | Electronic signature | (Omitted) |
| | Public key certificate | (Omitted) |

IDENTIFICATION CARD ISSUING APPARATUS AND IDENTIFICATION CARD ISSUING METHOD

CROSS-REFERENCE TO RELATED APPLICATIONS

This application is based upon and claims the benefit of priority from prior Japanese Patent Application No. 2004-150633, filed May 20, 2004, the entire contents of which are incorporated herein by reference.

BACKGROUND OF THE INVENTION

1. Field of the Invention

The present invention relates to an identification card issuing apparatus, and an identification card issuing method which prepares and issues various types of booklet-type or card type identification cards.

2. Description of the Related Art

In general, identification cards have been known on which private information is printed including a face photograph in addition to possessor's address and name, such as a booklet type private authenticating medium and a card type license. In recent years, an identification card has been developed in which an IC chip is contained in a medium, and private information is recorded in this IC chip in order to take a measure against false forgery and speed up certification of a person in question (see, e.g., Jpn. Pat. Appln. KOKAI Publication No. 2002-2154).

To prepare the identification card containing the IC chip, the above-described private information is printed on the surface of the medium, and the private information of the same person is written in the IC chip. The private information of the same person is recorded in the medium in another method in this manner. Therefore, for example, in a case where the private information printed on the medium surface is falsified, the falsification can be easily and securely found based on information written in the IC chip, and reliability can be enhanced.

However, when this identification card is prepared, the person indicated by the information printed on the medium surface is different from the person indicated by the information recorded in the IC chip. In this case, when the possessor is certified using this identification card, it is misunderstood that the identification card has been falsely forged, and the possessor suffers large disadvantages.

Especially, since the possessor of this identification card cannot easily confirm the private information written in the IC chip, the possessor does not known that the information of the different person has been recorded by mistake until the possessor is certified. For example, in a case where identification has a remarkably significant meaning as in immigration by a passenger, when the person notices that wrong information has been recorded, the mistake is irrevocable. That is, when the identification card containing the IC chip is issued, the information of the same person has to be securely recorded in the IC chip and medium surface, and the mistake is not permitted.

BRIEF SUMMARY OF THE INVENTION

An object of the present invention is to provide an identification medium issuing apparatus capable of recording private information of the same person as that indicated by private information printed on a medium surface in an IC chip without any mistake, and an identification medium issuing method.

To achieve the above-described object, according to the an embodiment of the present invention, there is provided an identification medium issuing apparatus comprising: a private information acquisition unit which acquires private information to specify an applicant who makes application for issuance of an identification medium; an identification information reading unit which reads identification information from an unused identification medium having a printing surface and an IC chip; a printing unit which prints, on the printing surface of the identification medium, the identification information read from the identification medium and the private information acquired by the private information acquisition unit; and a recording unit which records the private information and the identification information in the IC chip of the identification medium.

Moreover, according to the an embodiment of the present invention, there is provided an identification medium issuing apparatus comprising: a private information acquisition unit which acquires private information to specify an applicant who makes application for issuance of an identification medium; an identification information reading unit which reads identification information from an unused identification medium having a printing surface and an IC chip; an electronic signature preparation unit which prepares an electronic signature using the private information and the identification information; a printing unit which prints the private information and the identification information on the printing surface of the identification medium; a history storage unit which stores printing history in the printing unit; and a recording unit which reads the identification information from the identification medium on whose printing surface the information has been printed by the printing unit and which reads the printing history with respect to the identification medium from the history storage unit based on the identification information and which reads the electronic signature of the identification medium from the electronic signature preparation unit and which records, in the IC chip of the identification medium, the private information and the identification information based on the printing history together with the electronic signature.

Furthermore, according to an embodiment of the present invention, there is provided an identification medium issuing method comprising: a private information acquiring step of acquiring private information to specify an applicant who makes application for issuance of an identification medium; an identification information reading step of reading identification information from an unused identification medium having a printing surface and an IC chip; an electronic signature preparing step of preparing an electronic signature using the private information and the identification information; a printing step of printing the private information and the identification information on the printing surface of the identification medium; a history storage step of storing printing history in the printing step; and a recording step of reading the identification information from the identification medium on whose printing surface the information has been printed in the printing step, and reading the printing history with respect to the identification medium, stored in the history storage step, based on the identification information to record, in the IC chip of the identification medium, the private information and the identification information based on the printing history together with the electronic signature of the identification medium, prepared in the electronic signature preparing step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

Figure 1:
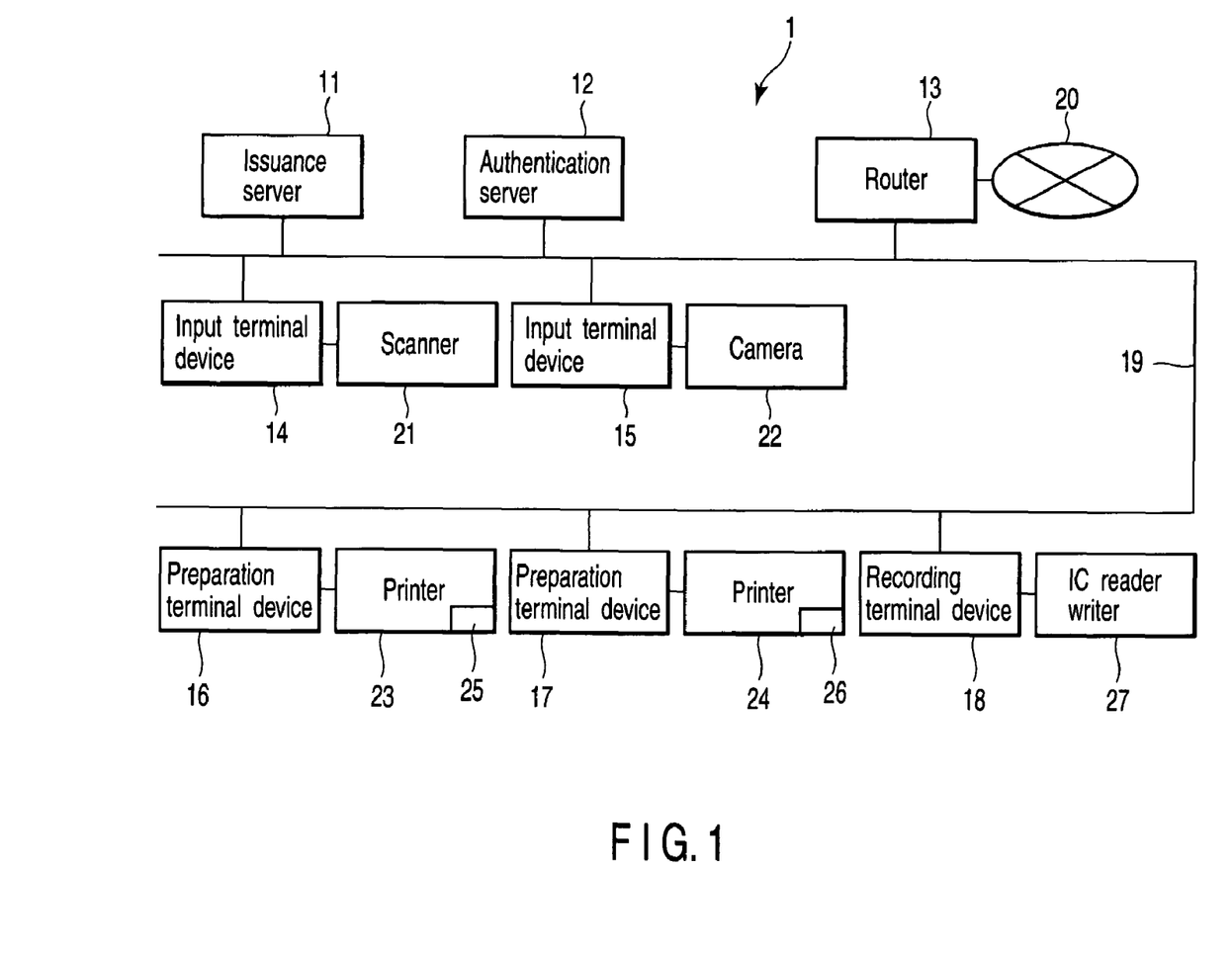
FIG. 1 is a block diagram schematically showing a constitution of an identification card issuing apparatus according to a first embodiment of the present invention.

FIG. 1 is a block diagram schematically showing a constitution of an identification card issuing apparatus 1 (hereinafter referred to simply as the issuing apparatus 1) according to a first embodiment of the present invention. This issuing apparatus 1 issues an identification card (identification medium) provided with a face image, for example, a booklet-shaped license. The issuing apparatus 1 has an issuance server 11, an authentication server 12, a router 13, input terminal devices 14, 15, preparation terminal devices 16, 17, and a recording terminal device 18. These devices 11, 12, 13, 14, 15, 16, 17, 18 are connected to a communication circuit 19 such as LAN, so that they can communicate with one another.

The issuance server 11 is a computer which functions as a history storage unit of the present invention and which records issuance information, history information, and investigation contents of an identification card. The issuance information is information relating to issuance history of an issued identification card, the history information is information (printing history, recording history) associated with an ID number of the identification card, and investigation contents include a check result of an investigation list (blacklist).

The authentication server 12 is a computer which functions as an electronic signature preparation unit of the present invention and which prepares an electronic signature based on data transmitted from the preparation terminal devices 16, 17 or the recording terminal device 18 to return the electronic signature. It is to be noted that the authentication server 12 can be installed on WAN connected via the router 13.

The router 13 is a network apparatus connected to a circuit network 20, and accepts confirmation of the electronic signature or reference to the issuance information recorded in the issuance server 11 from the outside of the issuing apparatus 1.

The input terminal device 14 reads, from an application form, a face photograph or a signature image of an applicant who makes application for issuance of an identification card using a scanner 21. The device accepts inputs of various information via input apparatuses such as a keyboard and a mouse (not shown). The input terminal device 15 directly photographs a face image of the applicant using a camera 22, and accepts the inputs of various information via the input apparatus (not shown). The input terminal devices 14, 15, scanner 21, and camera 22 function as a private information acquisition unit of the present invention.

The preparation terminal devices 16, 17 print surface information 38 described later on an identification medium described later using printers 23, 24. The printers 23, 24 contain IC readers/writers 25, 26. The preparation terminal devices 16, 17 read an ID number written in an IC chip 35 described later, contained in the identification medium, using the IC readers/writers 25, 26 contained in the respective printers 23, 24. The preparation terminal devices 16, 17, and the printers 23, 24 function as printing units of the present invention, and the IC readers/writers 25, 26 function as identification information reading units of the present invention.

The recording terminal device 18 writes information into the IC chip of the identification card or reads the information from the IC chip using an IC reader/writer 27. The recording terminal device 18 and the IC reader/writer 27 function as recording units of the present invention.

Figure 2:
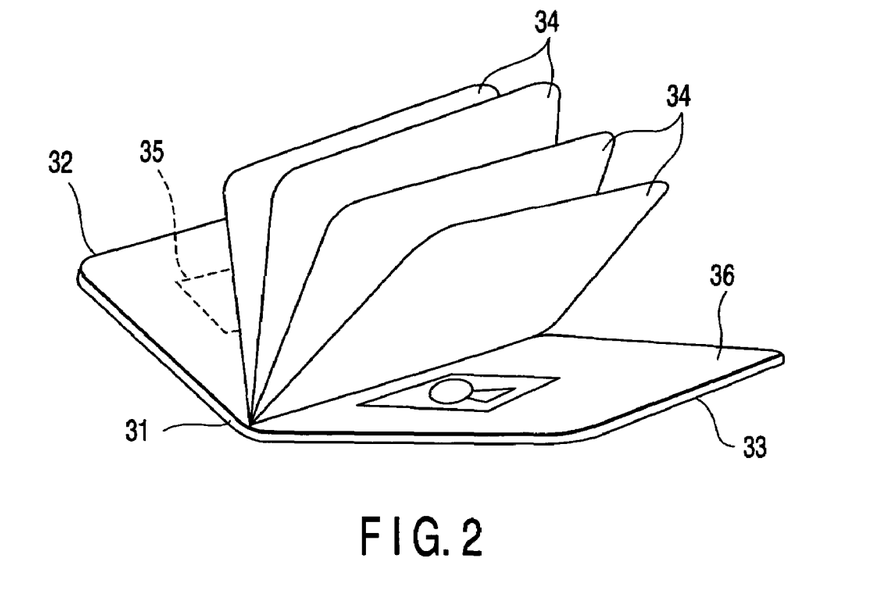
FIG. 2 is a perspective view showing one example of an identification card prepared by the issuing apparatus of FIG. 1.
Figure 3:
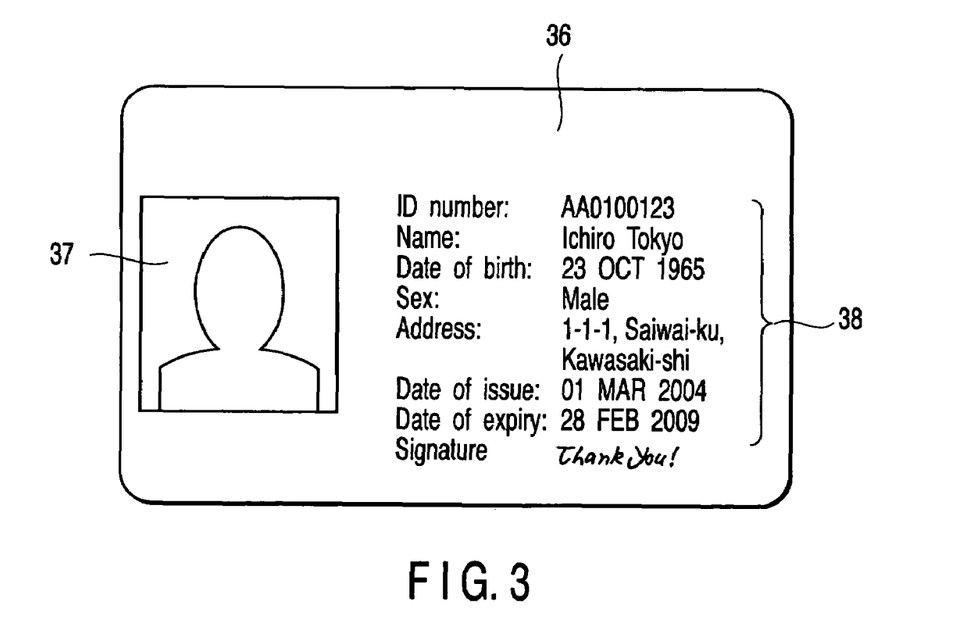
FIG. 3 is a plan view showing a printing surface of the identification card of FIG. 2.

FIG. 2 is a schematic perspective view showing one example of an identification card 31 manufactured by the issuing apparatus 1 according to the present embodiment, and FIG. 3 is a schematic plan view showing a printing surface 36 of the identification card 31.

The identification card 31 is formed into a booklet shape like a banknote of a certain bank, and a plurality of intermediate sheets 34 are filed between two cover sheets 32, 33. Moreover, the IC chip 35 is buried as a memory medium in one cover sheet 32. It is assumed that the ID number of the identification card 31 is stored as inherent identification information beforehand in the IC chip 35.

It is to be noted that the IC chip 35 may be of a non-contact type which performs radio communication with the IC reader/writer 27, and may be of a contact type which is brought into contact with a contact portion of the IC reader/writer 27 to perform communication. The IC chip 35 may be buried in the intermediate sheet 34.

The inside of the other cover sheet 33 constitutes the printing surface 36. As shown in FIG. 3, on the printing surface 36, a face image 37 of the applicant, and the surface information 38 are printed. The information 38 includes the ID number of the identification card, name, date of birth, sex, and address of the applicant, date of issue and date of expiry of the identification card, a signature image of the applicant and the like. The contents of the surface information 38 differ with the type of the identification card. The surface information 38 may be subjected to color printing or double-faced printing if necessary.

Figure 4:
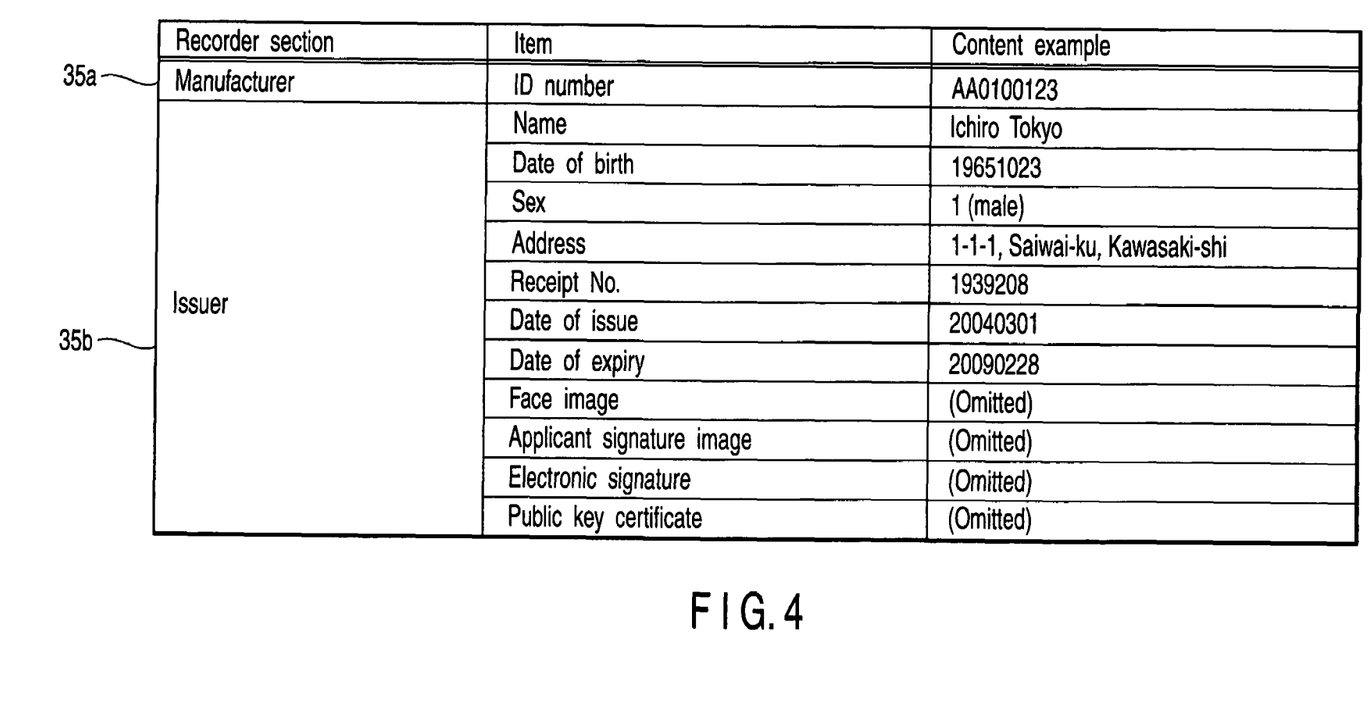
FIG. 4 is a diagram showing one example of information recorded in an IC chip contained in the identification card.

FIG. 4 shows one example of information recorded in the IC chip 35 contained in the identification card 31. When roughly divided, the IC chip 35 has a manufacturer recording region 35a to be recorded by a manufacturer of the identification card 31, and an issuer recording region 35b to be recorded by the issuer of the identification card 31. The ID number of the identification card is recorded as inherent identification information in the manufacturer recording region 35a. The ID number corresponds, for example, to a manufacturing number of the identification card 31, and a serial and unique number is usually assigned.

In the issuer recording region 35b, information is recorded such as name, date of birth, sex, and address of an applicant who makes application for issuance of the identification card, receipt number of issuance application, date of issue, and date of expiry of the identification card, a face image, a signature image by the applicant, an electronic signature, and a public key certificate. The name, date of birth, sex, address, face image, and signature image are private information of the issuance applicant (possessor) of the identification card 31. The receipt number is unique management information for use before application acceptance, investigation, and issuance of the identification card 31. The date of issue is a date when the identification card 31 was issued. The date of expiry is a date when the identification card 31 expires, and a period is usually set to three years, five years, or ten years from the date of issue.

The face image (does not have to be the same face image as that of the surface information) is of the same person as that whose surface information 38 has been printed on the printing surface 36 of the identification card 31, and the image is recorded in the IC chip 35. It is to be noted that the private information capable of specifying an individual additionally includes biological information such as applicant's iris, fingerprint, and palm print.

The electronic signature is information for guaranteeing legitimacy or integrity of the information, and is prepared by compressed information (hash information) of the surface information 38 including the face image 37 printed on the printing surface 36, and a secret key. When the electronic signature is prepared, the hash information is prepared including the ID number recorded by the manufacturer. This prevents recorded contents of another identification card from being simply duplicated or forged otherwise.

The public key certificate is a certificate with respect to a public key which forms a pair with the secret key used in preparing the electronic signature. It is to be noted that the public key certificate can be separately obtained via online at an inspection time without being recorded in the IC chip 35.

Figure 5:
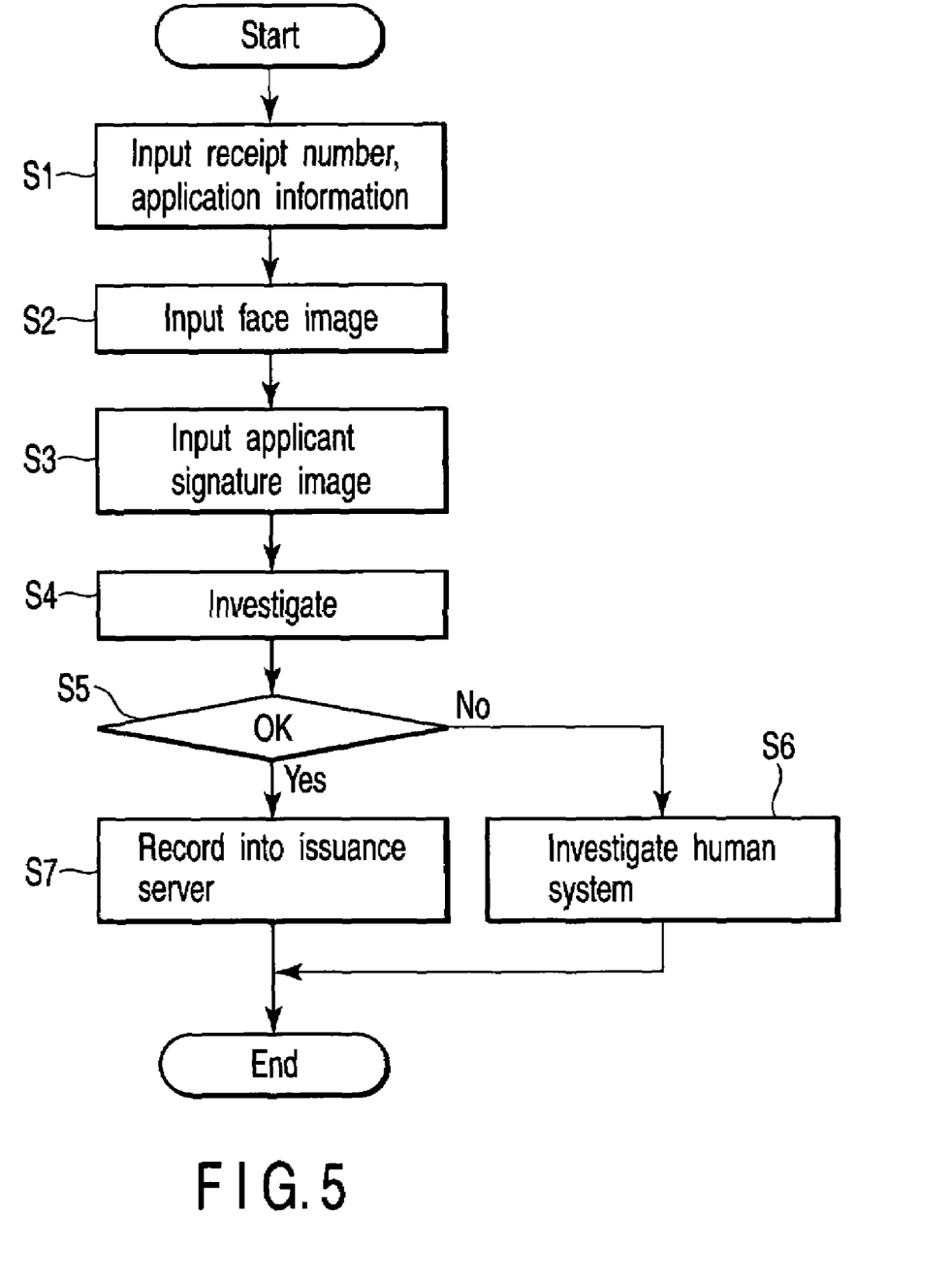
FIG. 5 is a flowchart showing a flow of a process in inputting and investigating information necessary for issuance of the identification card in the issuing apparatus of FIG. 1.

FIG. 5 is a flowchart showing a flow of a process in inputting and investigating information necessary for issuance of the identification card. The flow of the process will be described hereinafter with reference to this flowchart.

First, information required for the issuance of the identification card is input using an input apparatus such as a keyboard (not shown) of the input terminal device 14 or 15 (step 1). In the present embodiment, application information is input such as name, date of birth, sex, address, date of issue, and date of expiry together with the receipt number in receiving the application.

Next, the applicant's face image is acquired in the input terminal device 14 or 15 (step 2). That is, when the camera 22 is used, the applicant's face image is photographed on the spot, and input as digital image information. Alternatively, in a case where the face photograph is attached to the application formed prepared beforehand by the applicant, the form is set onto the scanner 21 to thereby read the applicant's face photograph.

Furthermore, the application form is set onto the scanner 21 to thereby read an applicant's signature image (step 3).

The information and image input in these steps 1 to 3 are displayed in a display screen (not shown) of the input terminal device 14 or 15, so that an operator can confirm that the information and image can be correctly acquired.

Next, an investigation list in the issuance server 11 is checked based on the application information input in the step 1 to check a black list, and a database is searched in which issuance information is stored in the issuance server 11 to check presence of double application (step 4). As a result of the check of the step 4, in a case where the application corresponds to the black list or the double application (step 5: NO), handling of the application is studied in human system investigation (step 6).

On the other hand, as a result of the investigation of the step 4, in a case where the result does not fall under each check (step 5; YES), the application information acquired in the step 1, the face image acquired in the step 2, and the signature image acquired in the step 3 are associated with the receipt number acquired in the step 1, and recorded in the issuance server 11 (step 7).

Figure 6:
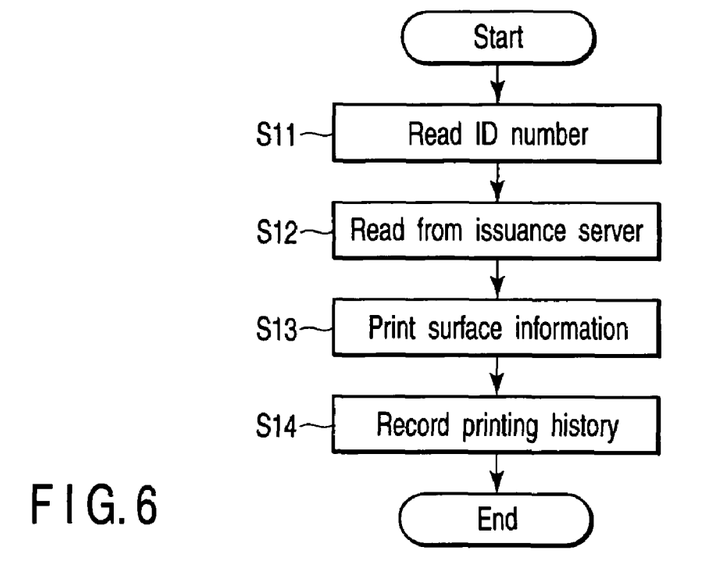
FIG. 6 is a flowchart showing a flow of a process in printing surface information by a preparation terminal device incorporated in the issuing apparatus of FIG. 1.
Figure 7:
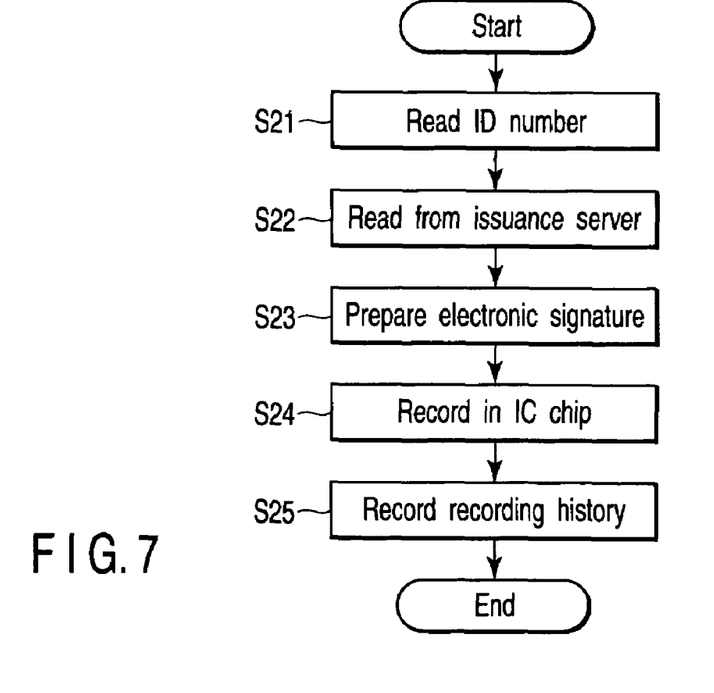
FIG. 7 is a flowchart showing a flow of a process in recording information in the IC chip by a recording terminal device incorporated in the issuing apparatus of FIG. 1.

FIG. 6 is a flowchart showing a flow of a process in printing the surface information 38 by the preparation terminal device 16 or 17, and FIG. 7 is a flowchart showing a flow of a process in recording information in the IC chip by the recording terminal device 18. The flow of process will be described concerning the issuance of the identification card with reference to these flowcharts. It is to be noted that here a case will be described where the surface information 38 is printed using the preparation terminal device 16.

First, the surface information 38 is printed by the preparation terminal device 16 in accordance with a procedure shown in FIG. 6.

In this case, an unused identification medium (not shown) is set on the printer 23. In the medium, information other than the ID number is not recorded in the IC chip 35, and the surface information 38 is not printed. Moreover, the ID number recorded by the manufacturer is read from the IC chip 35 of the identification medium by the IC reader/writer 25 contained in the printer 23 (step 11).

Next, the previously input (input in the step 1) receipt number is used as a key, and the application information, face image, and signature image having the corresponding receipt number are read from the issuance server 11 (step 12). At this time, the application information, face image, signature image and the like may be read in order of the receipt number, and may be read also in an order irrespective of the receipt number.

Moreover, the printer 23 associates the ID number acquired from the IC chip 35 in the step 11, and the application information, face image, and signature image acquired from the issuance server 11 in the step 12 to print the surface information 38 on the printing surface 36 of the identification medium (step 13).

Furthermore, the surface information 38 (ID number, application information, face image, signature image, etc.) printed at this time is recorded as history information in the issuance server 11 (step 14) to end a printing process.

Next, the information is recorded in the IC chip 35 by the recording terminal device 18 in accordance with a procedure shown in FIG. 7.

In this case, the identification medium is set on the IC reader/writer 27 to read the ID number recorded by the manufacturer from the IC chip 35 (step 21). On the identification medium, the surface information has been printed by the preparation terminal device 16.

Next, the recording terminal device 18 reads the application information, face image, and signature image having the corresponding ID number from the history information in the issuance server 11 using the ID number acquired in the step 21 (step 22).

Moreover, the recording terminal device 18 transmits, to the authentication server 12, the ID number acquired from the IC chip 35, and hash information of the application information, face image, and signature image acquired from the issuance server 11. The authentication server 12 prepares an electronic signature using a secret key based on the hash information transmitted from the recording terminal device 18 (step 23). The authentication server 12 acquires a public key certificate corresponding to the secret key if necessary. Furthermore, the authentication server 12 returns the prepared electronic signature to the recording terminal device 18 together with the public key certificate.

Next, the recording terminal device 18 records, in the IC chip 35, electronic data comprising the same information as the surface information 38 printed on the printing surface 36, that is, the ID number acquired from the IC chip 35, and the application information, face image, signature image, and public key certificate acquired from the issuance server 11 together with the electronic signature returned from the authentication server using the IC reader/writer 27 (step 24). At this time, the recording terminal device 18 reads contents recorded in the IC chip 35, and verifies/checks the contents to confirm that the data can be correctly recorded.

Finally, issuance information is recorded in the issuance server 11 including the ID number, application information, face image, signature image, electronic signature, public key certificate and the like recorded in the IC chip 35 in the step 24 (step 25) to end a recording process.

By the above-described process, for example, the identification card 31 is issued having the surface information 38 shown in FIG. 3. In the card, the same information as the surface information 38 is recorded in the IC chip 35. Since the electronic signature including the applicant's face image and the ID number of the identification card is recorded in the IC chip 35, legitimacy (correct issuer) or integrity (information is not falsified) is guaranteed with respect to the information.

As described above, according to the present embodiment, first the preparation terminal device 16 associates the printing contents with the ID number, and the recording terminal device 18 reads the ID number in the IC chip 35. The information corresponding to the ID number is recorded in the IC chip 35. This can securely prevent the printing contents with respect to the printing surface 36 and the recording contents with respect to the IC chip 35 from being mistaken, and reliability can be enhanced.

Figure 8:
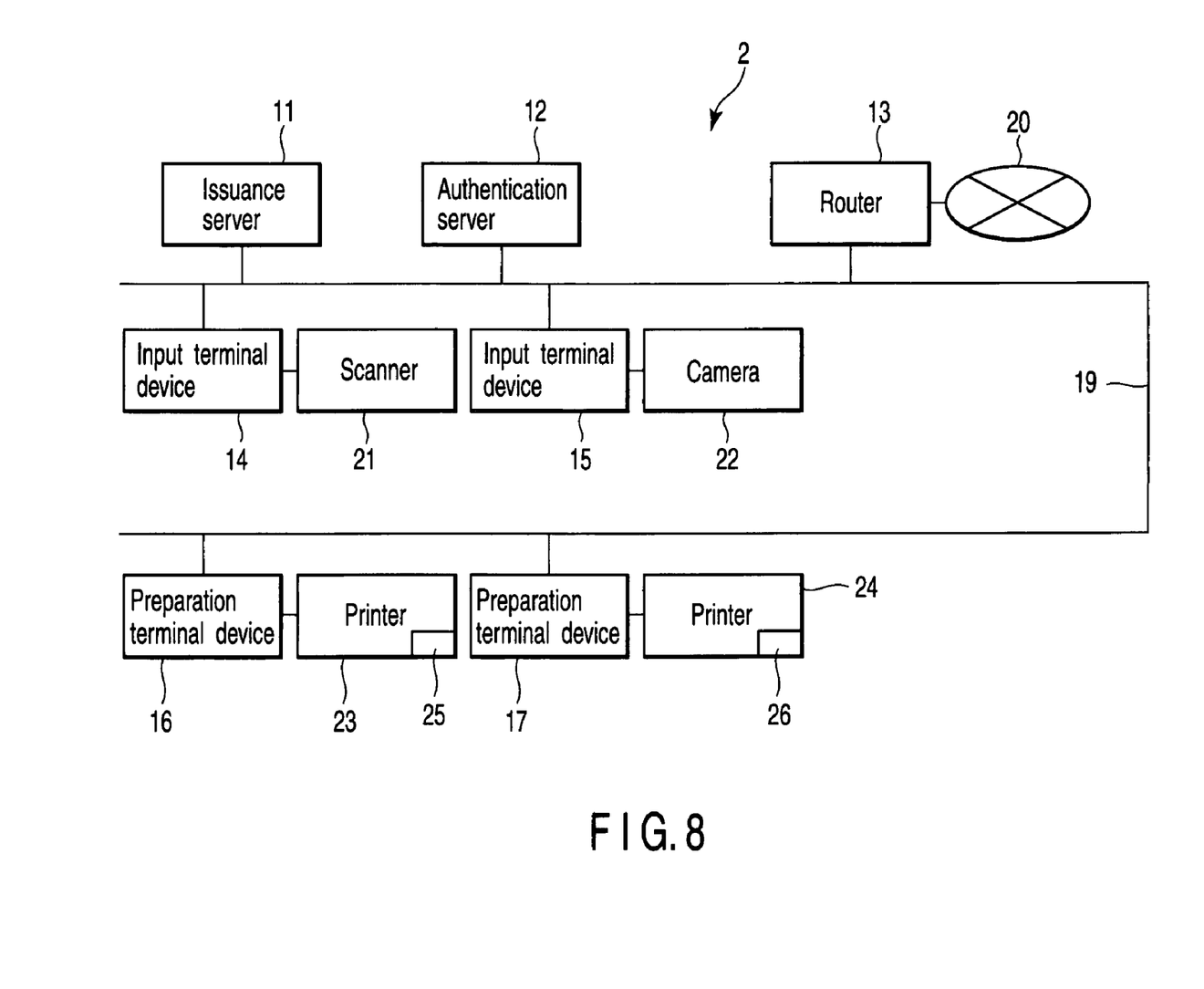
FIG. 8 is a block diagram schematically showing a constitution of an identification card issuing apparatus according to a second embodiment of the present invention.

FIG. 8 is a block diagram schematically showing a constitution of an identification card issuing apparatus 2 (hereinafter referred to simply as the issuing apparatus 2) according to a second embodiment of the present invention. The issuing apparatus 2 has the same structure as that of the first embodiment except that the recording terminal device 18 and the IC reader/writer 27 of the issuing apparatus 1 are removed. Constituting elements functioning in the same manner are denoted with the same reference numerals, and the detailed description is omitted.

Figure 9:
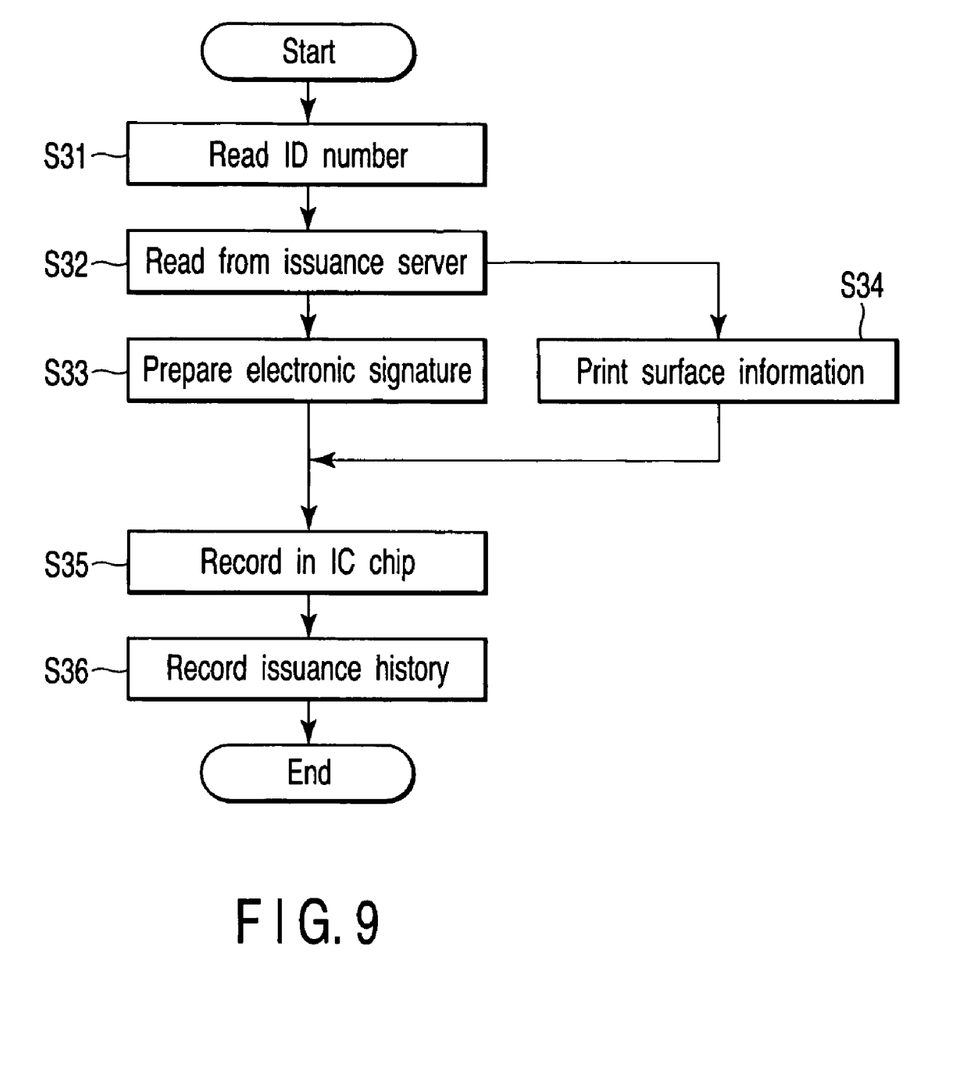
FIG. 9 is a flowchart showing a flow of a process in printing the surface information and recording information in the IC chip by the preparation terminal device of FIG. 8.

FIG. 9 is a flowchart showing a flow of a process in printing surface information 38 and recording information in an IC chip 35 by a preparation terminal device 16 (17) using the issuing apparatus 2 of FIG. 8, following the process described with reference to the flowchart of FIG. 5. A flow of an issuing process of an identification card will be described hereinafter with reference to the flowchart. Here, the use of the preparation terminal device 16 will be described as a representative case.

First, an unused identification medium is set on a printer 23 connected to the preparation terminal device 16. Moreover, an IC reader/writer 25 contained in the printer 23 reads an ID number recorded by a manufacturer from the IC chip 35 of the identification card (step 31).

Next, the preparation terminal device 16 reads application information, face image, and signature image having the corresponding receipt number from an issuance server 11 using the previously input (input in the step 1) receipt number as a key (step 32).

Moreover, the preparation terminal device 16 transmits, to an authentication server 12, the ID number acquired from the IC chip 35 in the step 31, and hash information of the application information, face image, and signature image acquired from the issuance server 11 in the step 32.

The authentication server 12 prepares an electronic signature using a secret key based on the hash information transmitted from the preparation terminal device 16 (step 33). The server acquires a public key certificate if necessary. Furthermore, the authentication server 12 returns the prepared electronic signature to the preparation terminal device 16.

In parallel with a process for preparing the electronic signature in the step 33, the preparation terminal device 16 associates the ID number acquired from the IC chip 35 in the step 31 with the application information, face image, and signature image acquired from the issuance server 11 in the step 32 to print the surface information 38 on a printing surface 36 of the identification medium using the printer 23 (step 34).

When the electronic signature prepared by the authentication server 12 in the step 33 is returned to the preparation terminal device 16, the preparation terminal device 16 records, in the IC chip 35, the same information (ID number, application information, face image, signature image, public key certificate, etc.) as the surface information 38 together with the returned electronic signature using the IC reader/writer 25, after normally ending the printing of the surface information 38 with respect to the printing surface 36 of the identification medium (step 35). At this time, the preparation terminal device 16 reads contents recorded in the IC chip 35, and verifies/checks the contents to confirm that the data can be correctly recorded.

Finally, issuance information is recorded in the issuance server 11 including the ID number, application information, face image, signature image, electronic signature, public key certificate and the like recorded in the IC chip 35 in the step 35 (step 36) to end an issuance process. By the above-described process, for example, the identification card 31 is issued as shown in FIG. 3.

As described above, according to the present embodiment, while the identification medium is set on the preparation terminal device 16, the surface information 38 is printed on the printing surface 36, and subsequently the information is recorded in the IC chip 35. This can securely prevent the printing contents with respect to the printing surface 36 and the recording contents with respect to the IC chip 35 from being mistaken, and reliability can be enhanced.

Therefore, during identification by the identification card, in a case where the information recorded in the IC chip 35 belongs to a different person, the information is not mistaken as false forgery, and a possessor of the identification card can be prevented in advance from being involved in large disadvantages.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

For example, in the above-described embodiments, after printing the surface information 38 on the printing surface 36 of the identification medium, the information is recorded in the IC chip 35. Conversely, after recording the information in the IC chip 35, the surface information 38 may be printed on the printing surface 36. In general, defects are easily generated in the printing process as compared with the recording process of the information in the IC chip 35. Therefore, it is preferable to first perform the printing process onto the printing surface.

Moreover, in the above-described embodiments, it has been described that the receipt number is associated with the application information, face image, signature image and the like acquired via the input terminal devices 14, 15 to record the data in the issuance server 11. However, the present invention is not limited to this case. Various information may be recorded not in the issuance server 11, but in, for example, the input terminal devices 14, 15, preparation terminal devices 16, 17, or the recording terminal device 18.

Furthermore, in the above-described embodiments, the apparatus has been described which prepares the booklet-shaped identification card. The present invention is not limited to this apparatus. For example, the present invention is applicable to a case where a card-shaped identification medium like an IC card is prepared.

Additionally, in the above-described embodiments, it has been described that the ID number of the identification card is used as identification information which associates the surface information 38 printed on the printing surface 36 of the identification medium with the information recorded in the IC chip 35. The present invention is not limited to this case. The production number of the IC chip 35 or that of the identification medium may be used as the identification information.

Further, in the embodiments described above, the number unique to the IC chip is identical to the ID number of the identification card. Instead, the number unique to the IC chip need not be identical to the ID number of the identification card issued.

What is claimed is:

1. An identification medium issuing apparatus comprising:
   a private information acquisition unit which acquires private information to specify an applicant who makes application for issuance of an identification medium;
   an identification information reading unit which reads identification information from an unused identification medium having a printing surface and an IC chip;
   an electronic signature preparation unit which prepares an electronic signature using the private information and the identification information;
   a printing unit which prints the private information and the identification information on the printing surface of the identification medium;
   a history storage unit which stores printing history in the printing unit; and
   a recording unit which reads the identification information from the identification medium on whose printing surface the information has been printed by the printing unit and which reads the printing history with respect to the identification medium from the history storage unit based on the identification information and which reads the electronic signature of the identification medium from the electronic signature preparation unit and which records, in the IC chip of the identification medium, the private information and the identification information based on the printing history together with the electronic signature.

2. The identification medium issuing apparatus according to claim 1, wherein the private information includes at least one biological information selected from a group consisting of an applicant's face image, iris, fingerprint, and palm print.

3. The identification medium issuing apparatus according to claim 1, wherein the identification information is any one of an ID number of the identification medium, a manufacturing number of the IC chip, and a manufacturing number of the identification medium.

4. An identification medium issuing method comprising:
   a private information acquiring step of acquiring private information to specify an applicant who makes application for issuance of an identification medium;
   an identification information reading step of reading identification information from an unused identification medium having a printing surface and an IC chip;
   an electronic signature preparing step of preparing an electronic signature using the private information and the identification information;
   a printing step of printing the private information and the identification information on the printing surface of the identification medium;
   a history storage step of storing printing history in the printing step; and
   a recording step of reading the identification information from the identification medium on whose printing surface the information has been printed in the printing step, and reading the printing history with respect to the identification medium, stored in the history storage step, based on the identification information to record, in the IC chip of the identification medium, the private information and the identification information based on the printing history together with the electronic signature of the identification medium, prepared in the electronic signature preparing step.

5. The identification medium issuing method according to claim 4, wherein the private information includes at least one biological information selected from a group consisting of an applicant's face image, iris, fingerprint, and palm print.

6. The identification medium issuing method according to claim 4, wherein the identification information is any one of an ID number of the identification medium, a manufacturing number of the IC chip, and a manufacturing number of the identification medium.

* * * * *